Figure 1:
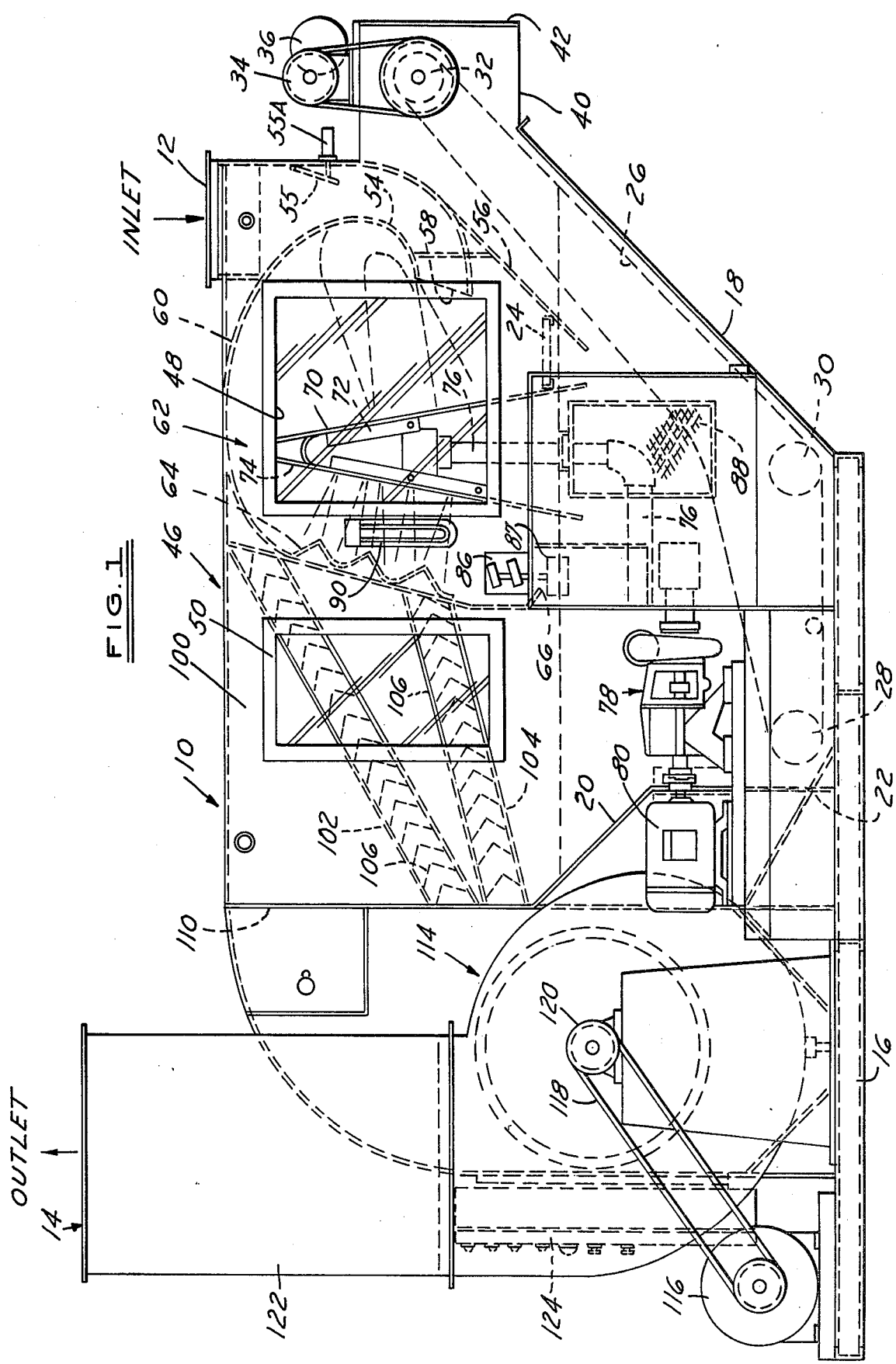

United States Patent [19]

Stergiou

[11] 4,165,973
[45] Aug. 28, 1979

[54] DUST COLLECTOR AND AIR SCRUBBER

[76] Inventor: Steve S. Stergiou, 9855 Rattalee Lake Rd., Clarkston, Mich. 48016

[21] Appl. No.: 810,522

[22] Filed: Jun. 27, 1977

[51] Int. Cl.² .................. B01D 47/02; B01D 47/06
[52] U.S. Cl. ................................. 55/228; 55/223; 55/238; 55/239; 55/241; 55/248; 55/257 PV; 55/439; 261/79 A; 261/118; 261/119 R
[58] Field of Search ............... 55/223, 227, 228, 241, 55/248-250, 257 PV, 257 PP, 238, 239, 439, 467; 261/118, 119 R, 79 A

[56] References Cited

U.S. PATENT DOCUMENTS

| | | | |
|---|---|---|---|
| 228,765 | 6/1880 | Kennedy | 261/118 X |
| 1,078,659 | 11/1913 | Barry | 261/118 X |
| 1,614,647 | 1/1927 | Brooks | 55/228 |
| 2,090,287 | 8/1937 | Cornelius | 261/118 X |
| 2,793,015 | 5/1957 | Thompson | 261/118 X |
| 2,818,135 | 12/1957 | White | 55/248 X |
| 3,520,521 | 7/1970 | Heller et al. | 261/118 |
| 3,710,551 | 1/1973 | Sved | 261/119 R X |
| 3,811,252 | 5/1974 | Evans et al. | 55/228 |
| 3,856,487 | 12/1974 | Perez | 261/118 X |
| 3,876,396 | 4/1975 | Arnold et al. | 261/118 X |
| 3,971,641 | 7/1976 | McNamara | 55/223 |

*Primary Examiner*—Frank W. Lutter
*Assistant Examiner*—Kathleen J. Prunner
*Attorney, Agent, or Firm*—Barnes, Kisselle, Raisch & Choate

[57] ABSTRACT

A dust collector and air scrubber which combines an inverted U-shaped water curtain section having multiple water sprays with a water bath and has a double bank eliminator section in advance of the outlet. A scrubber wall in the water spray area removes particulate and permits it to fall into and settle to the bottom of the water bath where it may be removed by a drag conveyor.

2 Claims, 4 Drawing Figures

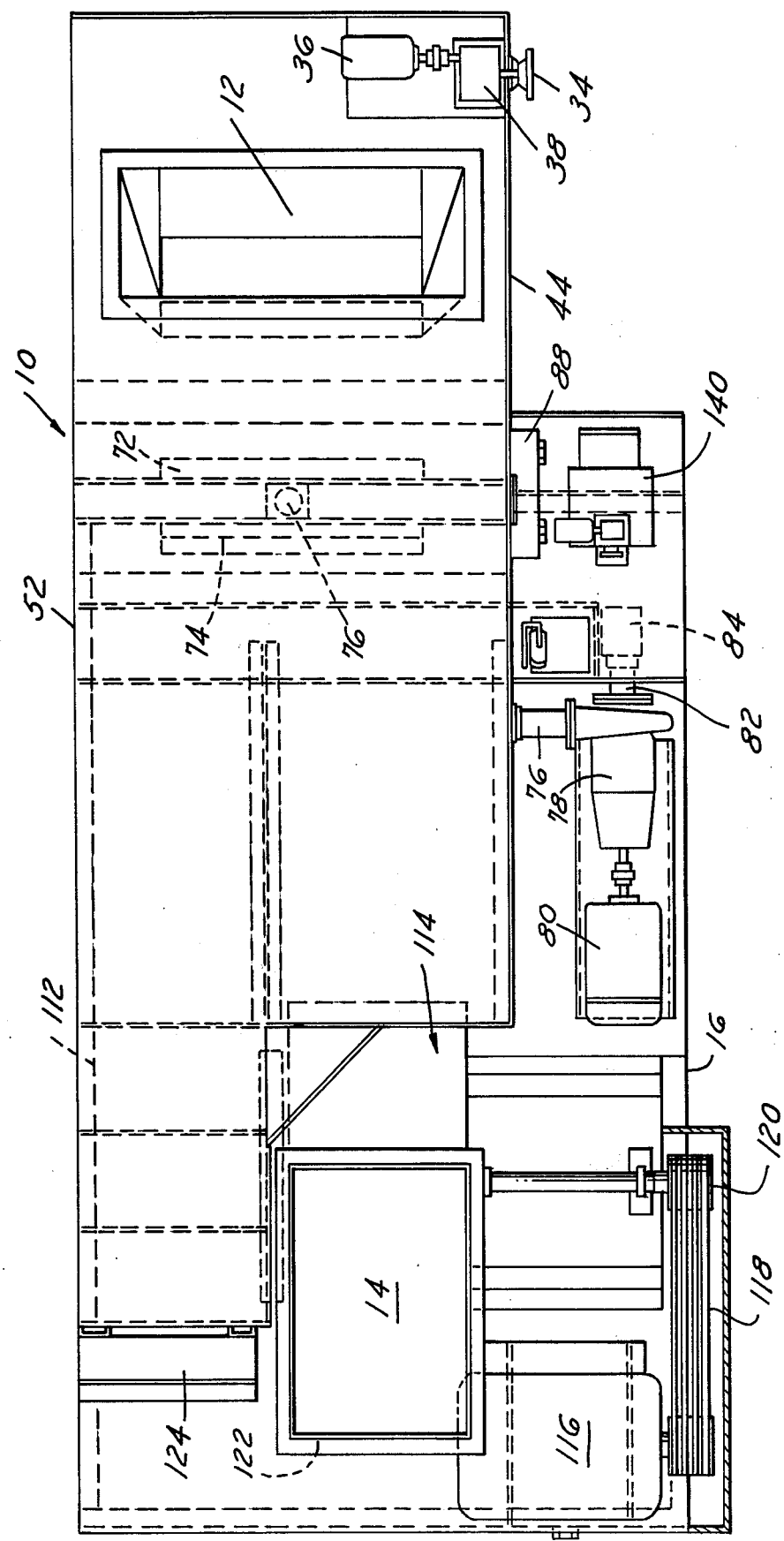

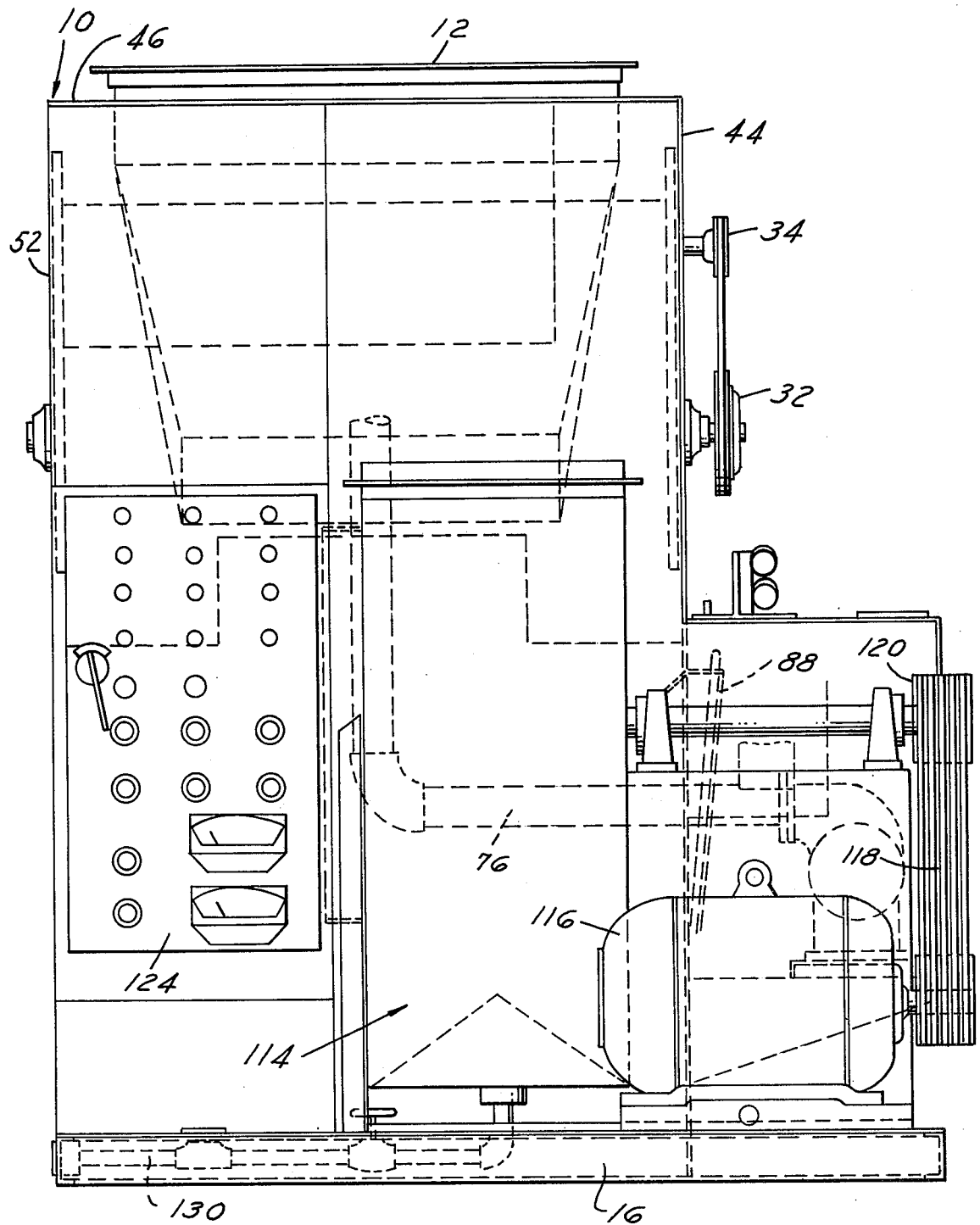

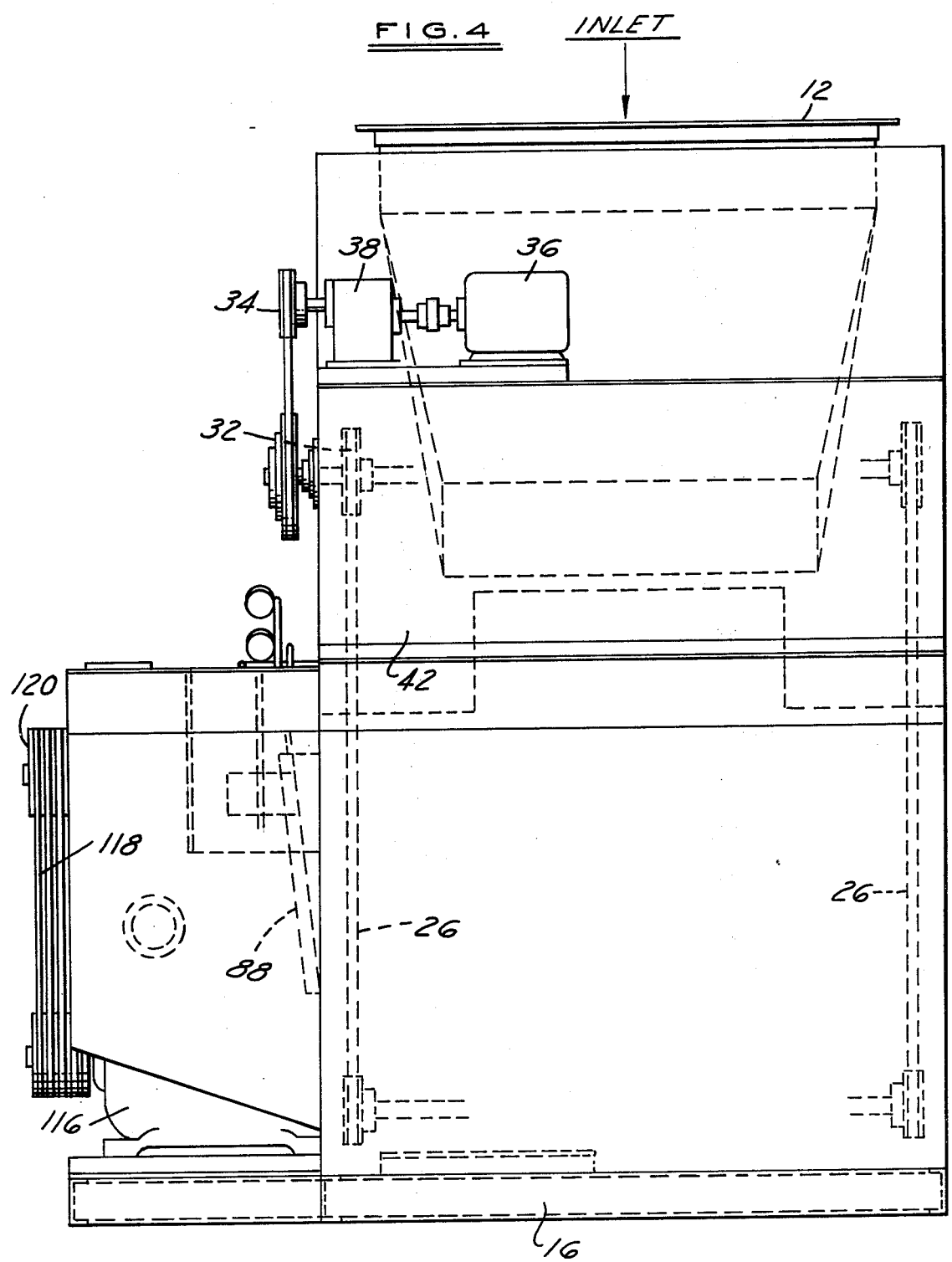

DUST COLLECTOR AND AIR SCRUBBER

This invention relates to a Dust Collector and Air Scrubber and more particularly to a compact piece of equipment for handling large quantities of air from an industrial area to remove contamination prior to discharge into the atmosphere.

Increased emphasis on environmental protection and health hazards has highlighted the need for air cleaning equipment which will handle large volumes of air from industrial areas. The purpose is to remove industrial dust and particulate from air which is being discharged into the atmosphere. In plants where large amounts of dust is inherent in the operation, such as foundries, it is essential that air discharged is relatively clean in order to prevent deposits on adjoining neighborhoods.

It is, therefore, an object of the present invention to provide a relatively compact air cleaning apparatus which can handle large quantities of air in a manner to permit collection and recovery of the particulate.

A further object is the provision of an air cleaning device which has a relatively low level of sound in operation and which is built to permit handling of the device as an integral unit. Thus, it can be preassembled and tested prior to installation in the desired location.

Other objects and features of the invention will be apparent in the following specification and claims in which the principles of the invention are set forth, together with details which will enable persons skilled in the art to practice the invention all in connection with the best mode presently contemplated for the invention.

DRAWINGS accompany the disclosure and the various views thereof may be briefly described as:

FIG. 1, a side elevation of the apparatus.
FIG. 2, a plan view.
FIG. 3, a rear view of the device.
FIG. 4, a front view of the device.

WITH REFERENCE TO THE DRAWINGS

An elongate housing shown generally at 10 has an inlet chamber 12 and an outlet pipe 14. The housing is built on a base 16 which can be welded together from suitable angle irons. The base has upwardly extending side walls and end walls to provide a water basin for sediment under a substantial section of the device. An end wall 18 extends upwardly at an angle from the base and this end wall has an opposite end 20 which angles down to a vertical plate 22, there being side walls to complete the water basin portion of the device. A water level indicator 24 is provided, this being visible to an operator through windows which will be described.

A drag conveyor for sediment removal as shown in dotted lines at 26 is guided by pulleys 28, 30, and 32, the latter pulley serving as a drive pulley and driven by a sprocket 34 actuated by a motor 36 through a suitable gear reducer 38. The drag chain will dump through an opening 40 above the water level in the water basin. An end wall 42 closes this portion of the housing. A side wall 44 closes the device up to a top wall 46 on the side facing the viewer in FIG. 1, this wall having water sealed windows 48 and 50 to allow a viewing of the action within the device. The back wall 52 of the device as viewed in FIG. 1 closes the structure. The downwardly extending air inlet 12 is composed of a rectangular opening as shown best in the top view of FIG. 2, and this opening narrows down at 54 to provide a venturi passage which will accelerate the air as it moves into the unit. A damper 55 with a control 55A is interposed in the venturi to allow regulation of the venturi opening.

A guard plate 56 underlies the exit 58 to this venturi and the venturi opens into an airflow section in the form of an inverted U to provide a water curtain section which has a curved top plate 60 leading from the top of the opening 58 over a washer chamber 62 to an undulated wall forming a scrubber section at a scrubbing wall 64 formed of rather wide undulations of material to provide a sinusoidal or saw-tooth cross-section, the wall extending down to a terminal flange 66. The inverted U-shaped airflow section is formed by an inverted V-shaped assembly 70. In the washer section, a water curtain is provided by the inverted V-shaped assembly 70 which has a water spray barrier in the form of panels 72 and 74 on the respective sides fed by a pipe 76 connected to a pump 78 driven by a motor 80. These elements, i.e., the pump 78 and motor 80, are on the outside of the device as shown in the top plan view of FIG. 2. A return pipe for the pump 78 is shown at 82 connected to an inlet filter 84 in the bottom of the water basin. A float control element 86 with a float 87 will control the water at a predetermined level in the water basin and generally can be at slightly below the indicator 24. A screen filter is shown at 88 to prevent foreign objects from entering the water pump.

A manometer is also shown at 90 to register the static air flow pressure through the machine 62. Thus, air will pass from the inlet through the chamber 62 over the inverted V water spray assembly past the flange 66 and into an eliminator chamber 100. This eliminator chamber has two eliminator baffle ranks 102 and 104, each of which consists of spaced, chevronshaped baffles 106. The U.S. Pat. No. 3,811,252 to Evans and Johnson dated May 21, 1974 is referenced for a showing and description of moisture eliminators. This eliminator chamber is provided to remove water from the air and also remove additional particulate and dust from the air and water so that the water will pass down into the sediment settling water basin as the air moves through an opening 110 and down through a large passage tunnel 112 to the central inlet of an air moving device in the form of a large centrifugal fan 114. This fan is driven by a motor 116 and belts 118 leading to a pulley 120. The centrifugal fan outlet which enlarges in the typical design formation for centrifugal fans passes into the outlet chamber 122 leading to the outlet 14. A suitable control panel 124 is shown diagrammatically at the end of the unit to provide a place for an operator to control water flow, on-off motors, and so on. A water supply enters the unit through a pipe 130 shown at the base of FIG. 3.

An oil skimmer unit is shown at 140 as an optional unit in installations where a large amount of oil is in the air to be washed. The oil will rise to the surface of the water basin and may be skimmed off for recovery purposes.

In the operation of the device, it will be seen that when it is functioning, air from any industrial area will enter at 12 and pass through the venturi 54 into the scrubber chamber 62 where it will pass through the water curtain provided by the water sprays originating at 72 and 74. It will pass over the inverted V-shaped baffle assembly 70 and through the water curtain formed by spray jets from water spray panels 72 and 74 in the U-shaped chamber 62 and pass the scrubber wall 64 down against the surface of the predetermined water level in the water basin at the base of the unit and then upwardly into the eliminator section 100 where it moves through the ranks 102 and 104 with the included baffles to remove the water from the air. After this, it passes through the opening 110 and the passage that leads to the inlet of the fan 114 and thence to the outlet stack 122.

In order to give a dimensional orientation on the structure of the elongated housing 10, the overall length is about 17 feet and the overall width is about 8 feet. The width of the air passage is approximately 5 feet. The inlet is about 1½ feet wide and a little under 5 feet in length. The outlet is about 2 feet wide and about 3 feet in length. While these dimensions are not critical in the absolute sense, they are relative and will give an impression of the dimensions of the embodiment shown.

I claim:

1. In an air cleaning apparatus for removing solid and particulate matter from a contaminated air stream introduced into the apparatus of the type utilizing an underlying sediment collection tank and a drag conveyor for removing the sediment, that improvement which comprises:
   (a) an elongate housing having a downwardly extending air inlet at one end and an upwardly extending air outlet at another end downstream of the air inlet,
   (b) means forming an airflow section horizontally displaced downstream from said inlet in the form of an inverted U, one leg of the U adjacent said inlet receiving air from said inlet,
   (c) an inverted V-shaped assembly inserted in the U-shaped airflow section in such a manner that the airstream from said air inlet is forced to flow in an upward direction adjacent the one leg and in a downward direction adjacent the other leg, and having spray panels on its respective sides directing water jets transversely of each of said legs in a direction transverse to the flow of the airstream,
   (d) a water eliminator section displaced downstream horizontally from said U-shaped airflow section and disposed in such a manner that the airstream is forced to flow in a vertically upward direction therethrough, and including two ranks of spaced chevron-shaped baffles extending across said water eliminator section wherein said upwardly moving airstream is forced to flow directly through said baffles in said water eliminator section, and
   (e) an air moving device spaced horizontally downstream from and below said water eliminator section having an inlet disposed so as to draw the airstream downwardly from said water eliminator section and an outlet disposed to direct the airstream upwardly to said air outlet.

2. An air cleaning device as defined in claim 1 in which the other leg of said U-shaped section is formed as an undulated wall to serve as a scrubber section for the downwardly flowing airstream leaving said U-shaped airflow section.

* * * * *